United States Patent
Rasul et al.

(10) Patent No.: US 11,001,499 B2
(45) Date of Patent: May 11, 2021

(54) GRAPHENE OXIDE PARTICLES AND METHOD OF MAKING AND USING THEM

(71) Applicant: KING ABDULLAH UNIVERSITY OF SCIENCE AND TECHNOLOGY, Thuwal (SA)

(72) Inventors: Shahid Rasul, Thuwal (SA); Pedro M. F. J. Costa, Thuwal (SA); Amira Alazmi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 295 days.

(21) Appl. No.: 16/098,577

(22) PCT Filed: May 30, 2017

(86) PCT No.: PCT/IB2017/053185
§ 371 (c)(1),
(2) Date: Nov. 2, 2018

(87) PCT Pub. No.: WO2017/208158
PCT Pub. Date: Dec. 7, 2017

(65) Prior Publication Data
US 2019/0144285 A1    May 16, 2019

Related U.S. Application Data

(60) Provisional application No. 62/343,527, filed on May 31, 2016.

(51) Int. Cl.
*C01B 32/198* (2017.01)
*H01M 4/587* (2010.01)
(Continued)

(52) U.S. Cl.
CPC .......... *C01B 32/198* (2017.08); *C01B 32/192* (2017.08); *C01B 32/23* (2017.08);
(Continued)

(58) Field of Classification Search
CPC ..... C01B 32/198; C01B 32/192; C01B 32/23; C01B 2204/22; C01B 2204/32;
(Continued)

(56) References Cited

U.S. PATENT DOCUMENTS 9,428,394 B2    8/2016   Tour et al.
2012/0129736 A1*  5/2012  Tour ..................... B82Y 40/00
                                                      507/140
(Continued)

OTHER PUBLICATIONS

Marcano et al., Improved Synthesis of Graphene Oxide, ACSNano 2010; 4(8): 4806-4814 (Year: 2010).*
(Continued)

*Primary Examiner* — Daniel C. McCracken
(74) *Attorney, Agent, or Firm* — Patent Portfolio Builders PLLC

(57) ABSTRACT

The present invention is an improved method of production of graphenic materials used to store energy and the energy storage systems using such produced graphenic materials. Provided herein is a method of producing graphene oxide that includes oxidizing graphite powder in a mixture of $H_3PO_4$ and $H_2SO_4$ in the presence of $KMnO_4$, wherein the ratio of graphite powder to $KMnO_4$ is about 1:9 by weight and the ratio of $H_3PO_4$ to $H_2SO_4$ is about 1:9 by volume, to produce graphene oxide; dispersing the graphene oxide in water at an acidic pH (e.g., about 0) to form a solution; adjusting the solution to about a neutral pH; and isolating the graphene oxide. An energy storage device is provided herein that includes the graphene oxide made by the disclosed methods or that includes the population (plurality) of (Continued)

reduced graphene oxide particles having the properties disclosed herein, such as batteries and supercapacitors.

16 Claims, 8 Drawing Sheets

(51) Int. Cl.
  *C01B 32/23*   (2017.01)
  *H01G 11/36*   (2013.01)
  *H01G 11/86*   (2013.01)
  *C01B 32/192*   (2017.01)

(52) U.S. Cl.
  CPC .............. *H01G 11/36* (2013.01); *H01G 11/86* (2013.01); *H01M 4/587* (2013.01); *C01B 2204/22* (2013.01); *C01B 2204/32* (2013.01); *C01P 2002/72* (2013.01); *C01P 2002/82* (2013.01); *C01P 2002/85* (2013.01); *C01P 2002/88* (2013.01); *C01P 2004/03* (2013.01); *C01P 2004/50* (2013.01); *C01P 2006/12* (2013.01); *C01P 2006/40* (2013.01); *Y02E 60/13* (2013.01)

(58) Field of Classification Search
  CPC .............. C01B 32/182; C01B 2204/00; C01B 2204/02; C01B 2204/04; C01B 2204/06; C01B 2204/065; C01B 2204/20; C01B 2204/24; C01B 2204/26; C01B 2204/28; C01B 2204/30; C01B 32/20; C01B 32/205; C01B 32/21; C01B 32/215; C01B 32/22; C01B 32/225; H01G 11/36; H01G 11/86; H01M 4/587; Y02E 60/13; Y02E 60/10; C01P 2002/72; C01P 2002/82; C01P 2002/85; C01P 2002/88; C01P 2004/03; C01P 2004/50; C01P 2006/12; C01P 2006/40

See application file for complete search history.

(56) References Cited

U.S. PATENT DOCUMENTS

2014/0079932 A1*   3/2014   Aksay ................... B82Y 30/00
                      428/219
2015/0218002 A1*   8/2015   Plomb ..................... C01B 32/23
                      423/448

OTHER PUBLICATIONS

Alazmi, et al., Comparative study of synthesis and reduction methods for graphene oxide, Polyhedron 2016; 116: 153-161 (Year: 2016).*

Huang, et al., Simple room-temperature preparation of high-yield large-area graphene oxide, International Journal of Nanomedicine 2011; 6: 3433-3448 (Year: 2011).*

Alazmi, A., et al., "Comparative Study of Synthesis and Reduction Methods for Graphene Oxide," Ployhedron, Pergamon Press, Oxford, GB, May 14, 2016, vol. 116, pp. 153-161.

Choi, B.G., et al., "Facilitated Ion Transport in All-Solid-State Flexible Supercapacitors," ACS NANO, Sep. 27, 2011, vol. 5, No. 9, pp. 7205-7213.

Huang, N.M., et al., "Simple Room-Temperature Preparation of High-Yield Large-Area Graphene Oxide," International Journal of Nanomedicine, Dec. 1, 2011, pp. 3443-3448.

International Search Report in related International Application No. PCT/IB2017/053185, dated Aug. 11, 2017.

Marcano, D.C., et al., "Improved Synthesis of Graphene Oxide," ACS NANO, Jul. 22, 2010, vol. 4, No. 8, pp. 4806-4814.

Written Opinion of the International Searching Authority in related International Application No. PCT/IB2017/053185, dated Aug. 11, 2017.

Zhou, Y., "Hydrothermal Dehydration for the "Green" Reduction of Exfoliated Graphene Oxide to Graphene and Demonstration of Tunable Optical Limiting Properties," Chemistry of Materials, Jul. 14, 2009, vol. 21, No. 13, pp. 2950-2956.

Zhu, Y., et al., "Graphene and Graphene Oxide: Synthesis, Properties, and Applications," Advanced Materials, Sep. 15, 2010, Vo. 22, pp. 3906-3924.

* cited by examiner

GRAPHENE OXIDE PARTICLES AND METHOD OF MAKING AND USING THEM

RELATED APPLICATION DATA

This application is a U.S. National Stage of International Application No. PCT/162017/053185, filed on May 30, 2017, entitled "GRAPHENE OXIDE PARTICLES AND METHOD OF MAKING AND USING THEM," which claims the benefit and priority of U.S. Provisional Patent Application Ser. No. 62/343,527 filed May 31, 2016, the disclosures of which are incorporated herein by reference in their entirety.

TECHNICAL FIELD

The present invention relates a method of production of graphenic materials used to store energy and energy storage systems using such produced graphenic materials.

BACKGROUND OF THE INVENTION

The background of this invention will address Electrical Energy Storage Systems, Electrochemical Capacitors and Graphene Oxide matters.

Electrical Energy Storage Systems

Electrical energy storage systems using electrochemical capacitors and batteries have been used in the past, but such systems have been woefully inefficient and ineffective in their performance and economic aspects. For instance, electrical energy storage systems that use batteries rely on chemical reactions between the components to produce electricity. In the chemical reaction, a battery releases electrons from certain constituent components and chemicals to generate electricity. The most common reactions between the chemical components in a battery involve acid or base reactions with metal components.

Batteries have a very limited life-span with most batteries functioning until the battery components or chemicals have been depleted of their available electrons, which usually necessitates discarding the battery. While some batteries can be re-charged, most batteries (even rechargeable ones) tend to lose their ability to hold an electrical charge over time, which necessitates the replacement of the depleted battery.

Chemical energy storage systems supported by battery power are measured by their levels of energy density, which translates to the energy stored per weight of the storage system. With the advent of miniaturized electronic devices, chemical energy storage systems have not kept pace with the need for smaller, faster, and longer lasting electrical energy storage systems that provide faster, higher capacity portable energy for miniaturized electronic devices. High capacity is particularly important in the context of renewable energy for such miniaturized electronic devices, as well as applications for larger devices and appliances.

Electrochemical Capacitors

Electrochemical capacitors have provided, in the past, a means of electrical charge, energy storage and electrical energy delivery, but the mode of storing a charge in an electrochemical capacitor operates much differently than in battery supported energy storage systems. Electrochemical capacitors (which are also been referred to as supercapacitors, electric double-layer capacitors or electrochemical double-layer capacitors), store energy either within an electrochemical double-layer at the electrode-electrolyte interface or through fast surface redox reactions.

In an electrochemical capacitor, current flows until complete charge balance is achieved between the two electrodes connected in an external current path. The capacitor can be returned to its charged state by application of voltage, and the process of recharging (or discharging) is fast and reversible because the charge is stored physically without reliance on chemical or structural phase changes, which allows the charging/discharging cycle to occur quickly and repeatedly.

Electrochemical capacitor devices can have very high specific and volumetric capacitances due to their larger surface area and the thin layers making up their construction. The capacitors can have both electrodes formed of the same type of high-capacity carbon material or a capacitor can have one electrode of high-capacity carbon and the other electrode of a different high capacity material. For operations requiring higher voltage, electrochemical capacitors can be connected as a series in the same manner as battery cells.

The market for electrochemical capacitors has been steadily increasing, in part, because of the longer life-cycle for such devices compared to battery life-cycles, as well as the enhanced dependability of the energy storage capacitors over batteries. Electrochemical capacitors are better suited than batteries for many devices, such as portable electronics, because such electronic devices require high cycle life and rapid charge/discharge cycle times. In some applications, supercapacitors and batteries can be used together advantageously, providing both rapid charging/discharging in addition to high energy density.

Over their life-cycle, electrochemical capacitors can be transitioned through the charge/discharge cycle thousands of time with minimal change in performance. Various materials, such as carbon materials, mixed-metal oxides, and conducting polymers, have been employed as electrodes for supercapacitors.

Graphene Oxide

Carbon substances have been used to fabricate electrode components in supercapacitors, including graphene or graphenic materials. Graphene is a carbon allotrope having a sheet-like structure of a single-layer or a relatively small number of layers, and the sheet-like structure comprises $sp^2$ hybridized carbon atoms. The $sp^2$ hybridization occurs when the 2s and 2p orbitals of carbon overlap leading to a "hybridized" $sp^2$ orbital configuration.

The chemical, electrical, and textural properties of graphene, which are critical to capacitance, can vary with the method of synthesis and the conditions of fabrication. Pure graphene can perform close to, or at, the theoretical maximum supercapacitance of 550 F $g^{-1}$.

Graphenic materials are similar to, or derived, from graphene, and a graphenic material that has gained interest in the field is graphene oxide, which is sometimes referred to as GO. Graphene oxide has a chemical structure with an $sp^2$ orbital configuration, but the graphene sheet in graphene oxide has been disrupted by the presence of epoxides, alcohols, carbonyls, and carboxylic acid functional groups. The properties of graphene oxide depend on the type and density of these surface functional group disruptions because such functional groups alter the ratio of $sp^2/sp^3$ hybridized carbon atoms, which in turn define chemical and physical behaviors of the graphene oxide.

The disrupted $sp^2$ structure of graphene oxide can be partially restored by reducing the graphene oxide through different treatment methods to produce so-called reduced graphene oxide (rGO). While reduced graphene oxide (rGO) has a graphene-like structure, chemical reduction processes cannot result in complete restoration of the $sp^2$ surface structure because substantial defects, such as holes or gaps, in the graphene lattice are still generated and present after the chemical restoration process. These lattice defects have a significant impact on the mechanical and electrical properties of graphene oxide (GO) and reduced graphene oxide (rGO).

A long-felt and unresolved problem with the use of graphene, graphene oxide (GO) and reduced graphene oxide (rGO) as a component in electronic equipment is that only a small quantity of graphene can be synthesized from graphite from existing processes, such as mechanical exfoliation or chemical vapor deposition (CVD). Commercially viable methods of large scale production of graphene, graphene oxide (GO) and reduced graphene oxide (rGO) are not achievable with known systems and methods. The large-scaled synthesis of graphene or graphenic material having the desired properties has proven to be a difficult problem to solve, and many skilled experts in the field have failed to find a proper solution to this problem. The lack of a process and system capable of such large scale synthesis of graphene and graphenic material is a long felt need in the state of the technology, which is entirely unresolved at the present time.

Many failed attempts have been made to solve the large-scale synthesis of graphene and graphenic materials through the use of mechanical exfoliation or chemical vapor deposition (CVD) methods and systems. These attempts to use mechanical exfoliation or chemical vapor deposition (CVD) methods and systems have not satisfactorily resolved the need for commercially-viable large scale synthesis of graphenic materials.

In mechanical exfoliation, thin (e.g. single or a few layers) graphene sheets are prepared by separating layers from the multi-layered graphite starting material. Techniques like the "scotch tape method" have been used to peel thin layers of graphenic material, including flakes, using adhesives, or alternatively, "shearing" methods using wedges have been used to separate thin slices of graphenic material away from the bulk graphite. To achieve the thin layers of graphene needed for supercapacitor electrodes, however, multiple mechanical exfoliation steps are required, with each step producing thinner layers until the desired thin sheet (single layer or a few layers) is attained. Although the mechanical exfoliation methods can produce high quality single layer graphene, it is not commercially viable due to the high production costs involved.

Graphene produced by mechanical exfoliation has a high degree of purity, but it is time-consuming and can be difficult to produce sheets that are large enough for many applications, which (combined with other difficulties) have been largely insurmountable problems encountered when attempts have been made to scale up mechanical exfoliation processes into a large-scale production method or system. Until the advent of the present invention, the large-scaled synthesis of a consistent graphene or graphenic material having the desired properties has proved to be a difficult task that is a long felt need in the state of the technology, and the prior art mechanical exfoliation processing techniques have failed to achieve large-scale synthesis of a uniform graphene or graphenic material by resolving the significant production problems associated with this technique.

Moreover, chemical vapor deposition (CVD) is used to deposit a thin-film coating of graphene onto a substrate. In one such CVD process, a metal substrate is heated under vacuum and reacted with gaseous methane, which leaves a solid thin-film coating on the substrate. Upon cooling, the carbon crystallizes into a graphene layer on the metal substrate.

The CVD method is relatively effective at producing sheets of the required size, but the graphene produced by this method carries a significantly high level of impurities (mainly from the catalyst used in the process). Such CVD processes have proven to be time-consuming and largely economically infeasible (expensive), which have been significant unresolved problems in the past when attempts are made to scale up CVD processes into a large-scale production method or system. The large-scaled synthesis of a consistent graphene or graphenic material having the desired properties has proved, prior to the present invention, to be a difficult task that is a long-felt need in the state of the technology, and past CVD processing techniques have failed to achieve large-scale synthesis of a uniform graphene or graphenic material by resolving the significant production problems associated with this technique.

Prior failed attempts have been made to solve the large-scale synthesis of graphene and graphenic materials through the use of chemical exfoliation of graphite methods and systems, including the Hummer's method and the IGO variation on the Hummer's method. These prior art chemical exfoliation techniques have failed to achieve large-scale synthesis of a uniform graphene or graphenic material by resolving the significant production problems associated with this technique. As such, these prior art chemical exfoliation methods and systems have not resolved the need for commercially-viable large scale synthesis of graphenic materials.

Bulk quantities of graphene oxide flakes have been synthesized by chemical exfoliation of graphite, primarily through the Hummer's method. In Hummer's approach, specific types of strong oxidizers are placed with graphite, which is thereby modified to produce graphene oxide (GO). This resultant graphene oxide (GO) is a hydrophilic and electrically insulating material. Another method for producing improved graphene oxide (IGO) was described in U.S. Patent Application No. 2012/0129736. In this improved graphene oxide (IGO) method, $NaNO_3$ is not used, so this method does not produce problematic by-products such as $NO_2$, $N_2O_4$, and/or $Cl_2O$.

Graphene and graphene oxide (GO) produced by these chemical exfoliation techniques has a high degree of impurities and produces problematic by-products. These prior art techniques are also time-consuming and have proven difficult to produce large-scale sheets of graphene or graphenic material that are sufficiently-sized for many applications. These unresolved problems continue to exist when attempts are made to scale up these chemical exfoliation processes into a large-scale production method or system. The large-scaled synthesis of a consistent graphene or graphenic material having the desired properties has proven to be a difficult task that is a long felt need in the state of the technology, and the prior art chemical exfoliation processing techniques have failed to achieve large-scale synthesis of a uniform graphene or graphenic material by resolving the significant production problems associated with this technique.

SUMMARY OF THE INVENTION

The present invention is an improved method of production of graphenic materials used to store energy and the energy storage systems using such produced graphenic materials. The methods of production in the present invention have demonstrated surprising efficiencies and effectiveness in resolving long-standing problems associated with large-scale production of commercially viable, adequately sized, and uniformly configured graphene, graphene oxide, and graphenic materials used in supercapacitor applications. The graphene oxide produced by the methods described herein exhibit improved performance relative to previously known carbon-based supercapacitor materials, including being highly effective at producing sheets of graphenic material of minimum required sizes, with significantly high levels of purity and reduced levels of negative reactants, all produced in more efficient, less time consuming and more economically feasible methods than are known to exist before this invention.

Provided herein is a method of producing graphene oxide that includes oxidizing graphite powder in a mixture of $H_3PO_4$ and $H_2SO_4$ in the presence of $KMnO_4$, wherein the ratio of graphite powder to $KMnO_4$ is about 1:9 by weight and the ratio of $H_3PO_4$ to $H_2SO_4$ is about 1:9 by volume, to produce graphene oxide; dispersing the graphene oxide in water at an acidic pH (e.g., about 0) to form a solution; adjusting the solution to about a neutral pH; and isolating the graphene oxide.

The present invention includes a process comprising the steps of: oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume; stirring the graphite and acid mixture in an ice bath for 10 minutes to 2 hours; adding $KMnO_4$ to the graphite-acid mixture in a graphite to $KMnO_4$ ratio from about 1:3 to 1:9 by weight; stirring the resulting mixture in an ice bath for 10 minutes to 2 hours to form a graphene oxide-dispersion; adding a volume of water to the graphene oxide-dispersion, said water having a pH of 0-3 and a volume about one-fourth of the starting acid volume, and stirring the water and graphene oxide dispersion for 10 minutes to 2 hours; heating the graphene oxide-dispersion to 60-120° C. for 6 minutes to 8 hours; cooling the graphene oxide-dispersion to room temperature; adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; adding excess alcohol to the graphene oxide-dispersion, wherein the alcohol is selected from methanol, ethanol, propanol, isopropanol, or butanol; isolating the graphene oxide by centrifugation; sequentially washing the isolated graphene oxide with acid, then water and then alcohol until the effluent reaches a pH of 7.0-7.2; and collecting the graphene oxide solids.

The oxidizing step in the present invention does not require the use of $NaNO_3$, and the present invention does not require the use of any additives, such as transition metals, to maximize capacitance. The adjusting step can include the addition of $Na_2CO_3$. The present invention can also reduce the isolated graphene oxide by a hydrothermal reduction, such as a hydrothermal reduction carried out by diluting the isolated graphene oxide in water to form a solution; disrupting or dispersing (e.g., by sonication) the diluted graphene oxide solution; heating the dispersed solution for about 24 hour at about 180° C.; and isolating the reduced graphene oxide.

A method of producing graphene oxide comprising the steps of: oxidizing graphite in a volume of phosphoric ($H_3PO_4$) and sulfuric ($H_2SO_4$) acids as a graphite-acid mixture wherein the ratio of $H_3PO_4$ to $H_2SO_4$ in the acid volume is from 1:3-1:9 by volume, said volume having a greater than 50% concentration of acid; stirring the graphite-acid mixture for 10 minutes to 2 hours; adding $KMnO_4$ to the graphite-acid mixture, wherein the graphite to $KMnO_4$ ratio is from 1:3 to 1:9 by weight; stirring the resulting mixture for 10 minutes to 2 hours to form a graphene oxide-dispersion; adding a volume of water to the graphene oxide-dispersion, said water having a pH of 0-3 and a volume about one-fourth of the starting acid volume, and stirring the water and graphene oxide dispersion for 10 minutes to 2 hours; heating the graphene oxide-dispersion to 60-120° C. for 6 minutes to 8 hours; cooling the graphene oxide-dispersion to room temperature; adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; adding excess alcohol to the graphene oxide-dispersion, wherein the alcohol is selected from methanol, ethanol, propanol, isopropanol, or butanol; isolating the graphene oxide by centrifugation; sequentially washing the isolated graphene oxide with acid, then water and then alcohol until the effluent reaches a pH of 7.0-7.2; and collecting the graphene oxide solids.

Disclosed herein is a method of producing graphene oxide comprising the steps of: (a) oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume; (b) stirring the graphite and acid mixture in an ice bath for 10 minutes to 2 hours; (c) adding $KMnO_4$ to the graphite-acid mixture in a graphite to $KMnO_4$ ratio from about 1:3 to 1:9 by weight; (d) stirring the resulting mixture from step (c) in an ice bath for 10 minutes to 2 hours to form a graphene oxide-dispersion; (e) adding a volume of water to the graphene oxide-dispersion, said water having a pH of 0-3 and a volume about one-fourth of the starting acid volume, and stirring the water and graphene oxide dispersion for 10 minutes to 2 hours; (f) heating the graphene oxide-dispersion to 60-120° C. for 6 minutes to 8 hours; (g) cooling the graphene oxide-dispersion to room temperature; (h) adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; (i) adding excess alcohol to the graphene oxide-dispersion, wherein the alcohol is selected from methanol, ethanol, propanol, isopropanol, or butanol; (j) isolating the graphene oxide by centrifugation; (k) sequentially washing the isolated graphene oxide with acid, then water and then alcohol until the effluent reaches a pH of 7.0-7.2; and (1) collecting the graphene oxide solids.

Also provided herein is a population (plurality) of reduced graphene oxide particles, wherein the reduced graphene oxide particles have a specific capacitance of greater than 250 Farads per gram ($F\ g^{-1}$) at a current of Angstrom per gram ($A\ g^{-1}$) (e.g., greater than 350 $F\ g^{-1}$ at a current of 1 $A\ g^{-1}$ or greater than 350 $F\ g^{-1}$ at a current of 1 $A\ g^{-1}$). The reduced graphene oxide particles may also retain greater than 60% capacitance at about 100 A g-1. The capacitance of the reduced graphene oxide particles is stable after 5000 cycles, and the reduced graphene oxide particles have a Brunauer-Emmett-Teller (BET) surface area value of less than 5 $m^2g^{-1}$ with $N_2$ gas adsorption and/or are substantially free of transition metals.

An energy storage device is provided herein that includes the graphene oxide made by the disclosed methods or that includes the population (plurality) of reduced graphene oxide particles having the properties disclosed herein. Examples of such storage devices include batteries and supercapacitors. An energy storage device comprising graphene oxide made by the method of: oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume; stirring the graphite and acid mixture in an ice bath for 10 minutes to 2 hours; adding $KMnO_4$ to the graphite-acid mixture, wherein the graphite to KMnO$_4$ ratio is from 1:3 to 1:9 by weight; stirring the resulting mixture from step (c) in an ice bath for 10 minutes to 2 hours to form a graphene oxide-dispersion; adding a volume of water to the graphene oxide-dispersion, said water having a pH of 0-3 and a volume about one-fourth of the starting acid volume, and stirring the water and graphene oxide dispersion for 10 minutes to 2 hours; heating the graphene oxide-dispersion to 60-120° C. for 6 minutes to 8 hours; cooling the graphene oxide-dispersion to room temperature; adjusting the graphene oxide-dispersion to a pH of 7.0-7.6, wherein the adjusting step comprises adding Na$_2$CO$_3$, NaOH, KOH, KCO$_3$, CaCO$_3$, or any mixture thereof; adding excess alcohol to the graphene oxide-dispersion, wherein the alcohol is selected from methanol, ethanol, propanol, isopropanol, or butanol; isolating the graphene oxide by centrifugation; sequentially washing the isolated graphene oxide with acid, then water and then alcohol until the effluent reaches a pH of 7.0-7.2; and collecting the graphene oxide solids.

BRIEF DESCRIPTION OF THE FIGURES

The above, and other objects and advantages of the present invention will be understood upon consideration of the following detailed description taken in conjunction with the accompanying figures, in which like reference characters refer to like parts throughout, and in which.

Figure 1A:
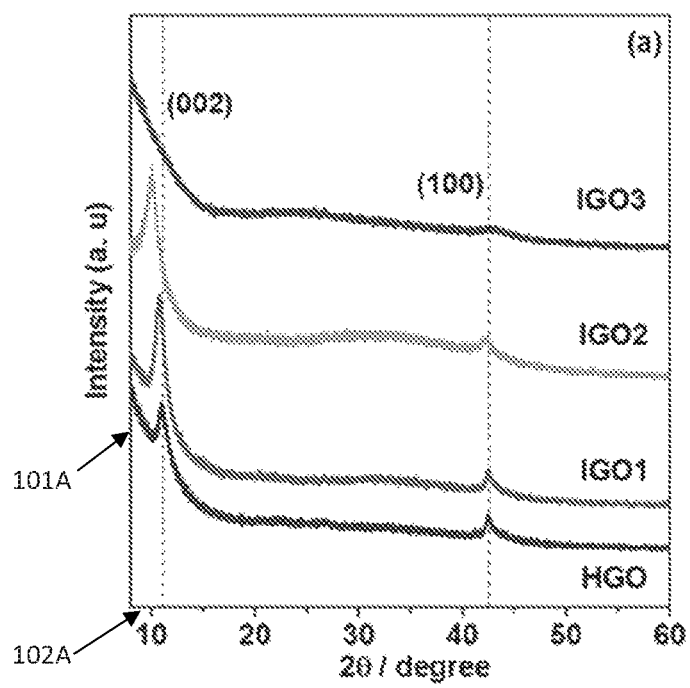
FIG. 1A shows x-ray diffraction of graphene oxides (IGO1, IGO2, and IGO3) made according to three different methods described herein as compared to a graphene oxide made according to the traditional Hummers' method (HGO).

While the invention is susceptible to various modifications and alternative forms, specific embodiments thereof have been shown by way of example in the figures and are herein described in detail. It should be understood that the description herein of specific embodiments is not intended to limit the invention to the particular forms disclosed, but on the contrary, the intention is meant to cover all modifications, equivalents, and alternatives falling within the spirit and scope of the invention as defined by the appended claims.

DETAILED DESCRIPTION

Pure graphene offers the highest electrical conductivity among known carbon type material. The use of carbon-based materials, particularly graphene, for electrode components has increased the energy density of supercapacitors, which has been approaching the energy density achieved with batteries. Graphene oxide and reduced graphene oxide may be used in optoelectronic and memory devices, composite materials, photo-electrocatalysis, drug delivery processes and energy storage applications including lithium-ion batteries and electrical double layer supercapacitors.

The present invention provides graphenic supercapacitor materials that have excellent supercapacitance performance. Described herein are graphene oxide materials for energy storage, energy storage systems comprising the materials, and methods for producing the materials. The graphene oxide is produced by carefully controlling the oxidation of graphite to graphene oxide, and then reducing the graphene oxide to reduced graphene oxide.

The present invention is an improved method of production of graphenic supercapacitor materials used to store energy and the energy storage systems using such produced graphenic materials. The methods of production in the present invention have demonstrated surprising efficiencies and effectiveness in resolving many long-standing problems associated with large-scale production of commercially viable, adequately sized, and uniformly configured graphene, graphene oxide, and graphenic materials used in supercapacitor applications. The graphene oxide produced by the methods described herein exhibit improved performance relative to previously known carbon-based supercapacitor materials, including being highly effective at producing sheets of graphenic material of minimum required sizes, with significantly high levels of purity and reduced levels of negative reactants, all produced in more efficient, less time consuming and more economically feasible methods than are known to exist before this invention.

Provided herein is a method of producing graphene oxide that includes oxidizing graphite powder in a mixture of H$_3$PO$_4$ and H$_2$SO$_4$ in the presence of KMnO$_4$, wherein the ratio of graphite powder to KMnO$_4$ is about 1:9 by weight and the ratio of $H_3PO_4$ to $H_2SO_4$ is about 1:9 by volume, to produce graphene oxide; dispersing the graphene oxide in water at an acidic pH (e.g., about 0) to form a solution; adjusting the solution to about a neutral pH; and isolating the graphene oxide.

The present invention includes a process comprising the steps of: oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume; stirring the graphite and acid mixture in an ice bath for 10 minutes to 2 hours; adding $KMnO_4$ to the graphite-acid mixture in a graphite to $KMnO_4$ ratio from about 1:3 to 1:9 by weight; stirring the resulting mixture from step (c) in an ice bath for 10 minutes to 2 hours to form a graphene oxide-dispersion; adding a volume of water to the graphene oxide-dispersion, said water having a pH of 0-3 and a volume about one-fourth of the starting acid volume, and stirring the water and graphene oxide dispersion for 10 minutes to 2 hours; heating the graphene oxide-dispersion to 60-120° C. for 6 minutes to 8 hours; cooling the graphene oxide-dispersion to room temperature; adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; adding excess alcohol to the graphene oxide-dispersion, wherein the alcohol is selected from methanol, ethanol, propanol, isopropanol, or butanol; isolating the graphene oxide by centrifugation; sequentially washing the isolated graphene oxide with acid, then water and then alcohol until the effluent reaches a pH of 7.0-7.2; and collecting the graphene oxide solids.

The oxidizing step in the present invention does not require the use of $NaNO_3$, and the present invention does not require the use of any additives, such as transition metals, to maximize capacitance. The adjusting step can include the addition of $Na_2CO_3$. The present invention can also reduce the isolated graphene oxide by a hydrothermal reduction, such as a hydrothermal reduction carried out by diluting the isolated graphene oxide in water to form a solution; disrupting or dispersing (e.g., by sonication) the diluted graphene oxide solution; heating the dispersed solution for about 24 hour at about 180° C.; and isolating the reduced graphene oxide.

A method of producing graphene oxide comprising the steps of: oxidizing graphite in a volume of phosphoric ($H_3PO_4$) and sulfuric ($H_2SO_4$) acids as a graphite-acid mixture wherein the ratio of $H_3PO_4$ to $H_2SO_4$ in the acid volume is from 1:3-1:9 by volume, said volume having a greater than 50% concentration of acid; stirring the graphite-acid mixture for 10 minutes to 2 hours; adding $KMnO_4$ to the graphite-acid mixture, wherein the graphite to $KMnO_4$ ratio is from 1:3 to 1:9 by weight; stirring the resulting mixture from step (c) for 10 minutes to 2 hours to form a graphene oxide-dispersion; adding a volume of water to the graphene oxide-dispersion, said water having a pH of 0-3 and a volume about one-fourth of the starting acid volume, and stirring the water and graphene oxide dispersion for 10 minutes to 2 hours; heating the graphene oxide-dispersion to 60-120° C. for 6 minutes to 8 hours; cooling the graphene oxide-dispersion to room temperature; adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; adding excess alcohol to the graphene oxide-dispersion, wherein the alcohol is selected from methanol, ethanol, propanol, isopropanol, or butanol; isolating the graphene oxide by centrifugation; sequentially washing the isolated graphene oxide with acid, then water and then alcohol until the effluent reaches a pH of 7.0-7.2; and collecting the graphene oxide solids.

Disclosed herein is a method of producing graphene oxide comprising the steps of: (a) oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume; (b) stirring the graphite and acid mixture in an ice bath for 10 minutes to 2 hours; (c) adding $KMnO_4$ to the graphite-acid mixture in a graphite to $KMnO_4$ ratio from about 1:3 to 1:9 by weight; (d) stirring the resulting mixture from step (c) in an ice bath for 10 minutes to 2 hours to form a graphene oxide-dispersion; (e) adding a volume of water to the graphene oxide-dispersion, said water having a pH of 0-3 and a volume about one-fourth of the starting acid volume, and stirring the water and graphene oxide dispersion for 10 minutes to 2 hours; (f) heating the graphene oxide-dispersion to 60-120° C. for 6 minutes to 8 hours; (g) cooling the graphene oxide-dispersion to room temperature; (h) adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; (i) adding excess alcohol to the graphene oxide-dispersion, wherein the alcohol is selected from methanol, ethanol, propanol, isopropanol, or butanol; (j) isolating the graphene oxide by centrifugation; (k) sequentially washing the isolated graphene oxide with acid, then water and then alcohol until the effluent reaches a pH of 7.0-7.2; and (l) collecting the graphene oxide solids.

Also provided herein is a population (plurality) of reduced graphene oxide particles, wherein the reduced graphene oxide particles have a specific capacitance of greater than 250 Farads per gram (F $g^{-1}$) at a current of Angstrom per gram (A $g^{-1}$) (e.g., greater than 350 F $g^{-1}$ at a current of 1 A $g^{-1}$ or greater than 350 F $g^{-1}$ at a current of 1 A $g^{-1}$). The reduced graphene oxide particles may also retain greater than 60% capacitance at about 100 A g-1. The capacitance of the reduced graphene oxide particles is stable after 5000 cycles, and the reduced graphene oxide particles have a Brunauer-Emmett-Teller (BET) surface area value of less than 5 $m^2g^{-1}$ with $N_2$ gas adsorption and/or are substantially free of transition metals.

An energy storage device is provided herein that includes the graphene oxide made by the disclosed methods or that includes the population (plurality) of reduced graphene oxide particles having the properties disclosed herein. Examples of such storage devices include batteries and supercapacitors. An energy storage device comprising graphene oxide made by the method of: oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume; stirring the graphite and acid mixture in an ice bath for 10 minutes to 2 hours; adding $KMnO_4$ to the graphite-acid mixture, wherein the graphite to $KMnO_4$ ratio is from 1:3 to 1:9 by weight; stirring the resulting mixture from step (c) in an ice bath for 10 minutes to 2 hours to form a graphene oxide-dispersion; adding a volume of water to the graphene oxide-dispersion, said water having a pH of 0-3 and a volume about one-fourth of the starting acid volume, and stirring the water and graphene oxide dispersion for 10 minutes to 2 hours; heating the graphene oxide-dispersion to 60-120° C. for 6 minutes to 8 hours; cooling the graphene oxide-dispersion to room temperature; adjusting the graphene oxide-dispersion to a pH of 7.0-7.6, wherein the adjusting step comprises adding $Na_2CO_3$, NaOH, KOH, $KCO_3$, $CaCO_3$, or any mixture thereof; adding excess alcohol to the graphene oxide-dispersion, wherein the alcohol is selected from methanol, ethanol, propanol, isopropanol, or butanol; isolating the graphene oxide by centrifugation; sequentially washing the isolated graphene oxide with acid, then water and then alcohol until the effluent reaches a pH of 7.0-7.2; and collecting the graphene oxide solids.

The degree of oxidation was tuned by varying the oxidative treatment to control the $sp^2/sp^3$ ratio in the IGO. Surprisingly, the IGO samples provided herein undergoing the most extensive oxidative treatment as precursors to rIGOs have dramatically improved optoelectronic, photoelectric, and energy storage properties as compared to HGO samples.

Methods of Producing Graphene Oxide and Reduced Graphene Oxide

In one preferred embodiment, graphene oxide is produced by oxidizing graphite powder in a mixture of $H_3PO_4$ and $H_2SO_4$, in the presence of $KMnO_4$, wherein the ratio of graphite powder to $KMnO_4$ is about 1:9 by weight and the ratio of $H_3PO_4$ to $H_2SO_4$ is about 1:9 by volume. Turning to specific components, any source of graphite may be utilized, including crystalline flake graphite, amorphous graphite, lump graphite, graphite powder, and/or highly oriented pyrolytic graphite. The graphite may be dispersed in a mixture of phosphoric ($H_3PO_4$) and sulfuric ($H_2SO_4$) acids.

The phosphoric and sulfuric acids may be neat or may be diluted in water to particular concentrations, such as greater than 50% acid, greater than 60% acid, greater than 70% acid, greater than 80% acid, greater than 90% acid, or greater than 95% acid. The ratio of $H_3PO_4$ to $H_2SO_4$ is about 1:3 by volume, about 1:6 by volume, or about 1:9 by volume. In one embodiment about 3 grams of graphite is dissolved in about 400 mL of the acid mixture, although other amounts may be used.

The dispersion of the graphite in the acid mixture can take place with stirring. The dispersion can be stirred for a period of time ranging from 10 minutes to 2 hours, inclusive of any time therein. Preferably, the dispersion is stirred for 1-2 hours, but the stirring can also take place at room temperature or in an ice bath. One embodiment requires that the stirring takes place in an ice bath or at comparably low temperatures.

The oxidation of graphite by the acid mixture takes place in the presence of an oxidant, such as potassium permanganate ($KMnO_4$). The oxidizing step is substantially free of $NaNO_3$ or is in the absence of $NaNO_3$.

The addition of the oxidizer to the graphite-acid dispersion can take place with stirring. The dispersion can be stirred for a period of time ranging from 10 minutes to 2 hours, inclusive of any time there between. The dispersion can be stirred with the dispersion for 10-60 minutes, and the stirring can take place at room temperature or in an ice bath. One embodiment requires the stirring to take place in an ice bath or at comparably low temperatures.

The method further comprises dispersing the graphene oxide formed by the oxidation step in water at an acidic pH to form a solution. The acidic pH can be from pH 0-3, inclusive of any pH in between. The pH of the water is near 0, and the volume of water added to the graphene oxide dispersion is from ⅛, ¼, or ½ of the dispersion volume, inclusive of any volume in between. One embodiment requires the volume of water is about ¼ of the dispersion volume, or substantially similar volumes.

The addition of the water to the graphene oxide dispersion takes place with stirring. The dispersion can be stirred for a period of time ranging from 10 minutes to 2 hours, inclusive of any time there between. The dispersion is stirred with the dispersion for 10-30 minutes, and the stirring can take place at room temperature or in an ice bath. One embodiment requires the stirring to take place in an ice bath or at comparably low temperatures.

The oxidizing step subjects the graphene-containing reaction mixture to heat. The reaction mixture may be heated to 60° C., 70° C., 80° C., 90° C., 100° C., 110° C., or 120° C., inclusive of any temperature in between. The reaction mixture may be heated for 6 minutes, 10 minutes, 15 minutes, 30 minutes, 60 minutes, 2 hour, 4 hours, 6 hours, or 8 hours, inclusive of any time in between. In general, higher reaction temperatures require shorter reaction times. The heating step takes place in an oil bath, and heating step lasts for 30 minutes to 90 minutes at a temperature of 80° C. to 100° C. One embodiment requires the heating step to last for at least 60 minutes in an oil bath at 90° C., or in a comparable medium or comparable temperature.

The method further comprises adjusting the pH level of the dispersion to a near neutral pH. The pH level of the dispersion can be adjusted to a neutral or near neutral pH with a neutralizing agent, which is added to the acidic solution. Any basic compound substantially consistent with the objectives of the method may be used in the invention, and the neutralizing agent is selected from the group consisting of $Na_2CO_3$, NaOH, KOH, $KCO_3$, or $CaCO_3$, and any mixture thereof. The neutralizing agent can be added until the pH level of the solution reaches a neutral to slightly basic pH, such as about 7.0, 7.1, 7.2, 7.4, or 7.6, inclusive of any pH therein. The neutralizing agent can be $Na_2CO_3$, and the pH can be adjusted to 7.0-7.2.

The method can include isolating the graphene oxide, and the isolating step can be facilitated by adding an excess of an alcohol, such as methanol, ethanol, propanol, isopropanol, butanol, or any combination thereof. The alcohol can be added to the graphene dispersion after adjusting the pH to near neutral, and the alcohol can be ethanol.

In some instances, the isolation of the graphene oxide is facilitated by centrifugation, such as at 6,000-12,000 rpm, inclusive of any speed therein. The centrifugation is at about 9,000 rpm, and the supernatant liquid may be decanted after centrifugation to collect the graphene oxide solids. The graphene oxide solids collected is washed sequentially with an acid, water, and/or an alcohol until the wash effluent has a pH of about 7. The acid can be hydrochloric acid (HCl), the alcohol can be ethanol, and the graphene oxide can be isolated after washing.

The method further comprises reducing the graphene oxide, where the graphene oxide may be converted to reduced graphene oxide by one of several alternative methods. For instance, the reduction may take place by thermal reduction under nitrogen, or by treatment with hydrazine hydrate, or by hydrothermal reduction. The specific capacitance was found to be 16 F $g^{-1}$ when reduced thermally in the presence of nitrogen ($N_2$), to be 85 F $g^{-1}$ when reduced by hydrazine, and to be 128 F $g^{-1}$ when reduced hydrothermally.

The isolated graphene oxide is reduced by hydrothermal reduction, and the hydrothermal reduction includes (a) diluting the isolated graphene oxide in water to form a diluted graphene oxide solution; (b) dispersing the diluted graphene oxide solution of step (a); (c) heating the dispersed solution of step (b) to induce reduction; and (d) isolating the reduced graphene oxide.

The dispersing in step (b) can be performed by any suitable dispersal means compatible with the graphene hydrothermal reduction process. Sonication (e.g., with ultrasonic frequency) is one example of a suitable dispersal means. The graphene oxide is sonicated for 5-60 minutes, inclusive of any time in between. Preferably, the sonication step is 15 minutes.

The heating in step (c) can be by any means suitable compatible with the graphene oxide. The dispersion is heated to a temperature between 150° C. to 200° C., inclusive of any temperature in between. The dispersion is heated for a period ranging from 6 hours to 48 hours, inclusive of any time in between. The dispersion can be heated for about 24 hours at about 180° C., or for comparable times and temperatures.

The present invention can produce rIGOs with d-spacing values close to graphite, indicating the near-complete restoration of the graphitic lattice in these materials. The morphology varies in the IGOs, and certain IGOs produced in the present invention are platelet-like and certain IGOs have a porous structure with variation in pore sizes. The porous structure produced by the present invention may arise from the excessive oxidation of the graphite in such a way that carbon lattice is "corroded" by oxygen and CO and $CO_2$ gases are released as a result, but reduction treatment in certain cases can produce a clear exfoliation.

In certain cases, the platelet size of rIGO is much smaller compared to other rGOs. Thermal gravimetric analysis (TGA) and Fourier transform infrared spectroscopy (FTIR) show that certain IGOs have a higher degree of oxidation than rIGO (graphene oxide produced by the Hummers' method). Certain of the rGOs have a small Brunauer-Emmett-Teller (BET) surface area compared to other GO and rHGO. The low specific surface area may result from self-agglomeration of the particles under vacuum degassing at 150° C. for 24 h prior to BET surface area measurements, but the measurement may not accurately reflect the surface area of the non-agglomerated particles used in measuring capacitance. During synthesis of IGO3, the excess of oxidizing agents used may result in self-reduction due to the cleavage of C—C bonds to form $CO_2$ and/or CO.

Reduced Graphene Oxide Particles

Also provided herein are reduced graphene oxide particles and pluralities of the reduced graphene oxide particles. The reduced graphene oxide particles possess a specific capacitance of greater than 250, 300, 350, or 370 F $g^{-1}$ or any amount in between at a current of 1 A $g^{-1}$. In some embodiments, the reduced graphene oxide particles retain greater than 50, 60, 70, 80, or 90% capacitance or any amount in between at about 100 A $g^{-1}$.

The reduced graphene oxide particles of the invention do not show significant degradation in capacitance performance over time. Cyclic performance is one of the key criteria to evaluate a material for supercapacitor applications. In some implementations, the population of reduced graphene oxide particles has a stable capacitance after 3000 cycles, 4000 cycles, 5000 cycles, 8000 cycles, or even 10,000 cycles, inclusive of any number of cycles there between.

In some embodiments of the invention, the reduced graphene oxide particles have a BET surface area value of less than 10, less than 7, less than 5, or less than 4 $m^2g^{-1}$ with $N_2$ gas adsorption. The Brunauer-Emmett-Teller (BET) analytical technique uses adsorption of inert gases on surfaces to determine the surface area of those surfaces.

Dopants, such as transition metals, have previously been used to enhance the supercapacitance of rGOs or chemically converted graphene. However, in the instant invention, the population of reduced graphene oxide particles does not contain transition metals or is substantially free of transition metals.

Using three electrode cell configuration with cyclic voltammetry (CV) and galvanostatic charge/discharge conditions, the reduced graphene oxide particles show supercapacitance performance. The CV testing shows rectangular-like curves from –0.1-0.9 V vs. a saturated calomel electrode (SCE) along with a slight pseudocapacitance contribution at 0.3 V. This pseudocapacitance may arise from the presence of residual oxygen functional groups (hydroxyl/epoxy and carboxyl).

The CV curves demonstrate that certain reduced graphene oxide particles have higher electrical double layer current (EDLC) compared to other reduced graphene oxide particles such as rHGO. The reduced graphene oxide particles of the present disclosure were charged/discharged under galvanostatic conditions at rather higher current density at 20 A $g^{-1}$ in the potential range of –0.1-0.9 V. The symmetrical triangles of the charge/discharge plots along with small IR drop (the voltage drop due to energy losses in a resistor) indicate an ideal EDLC behavior. Certain of the reduced graphene oxide particles disclosed herein show a specific capacitance approaching to 370 F at the current density of 1 A $g^{-1}$ and retain ~67% capacitance when tested at the extremely high rate of 100 A $g^{-1}$ with the specific capacitance increasing below 20 A $g^{-1}$.

Uses of the Graphene Oxide Particles

The graphene oxide particles disclosed herein may be used to fabricate electronic devices, such as energy storage devices. Either graphene oxide or reduced graphene oxide particles disclosed herein may be utilized in such devices. The population of reduced graphene oxide particles are made by the methods described herein. In some embodiments, the energy storage device is a battery, such as a lithium ion battery.

Battery anodes may be fabricated from or comprise the graphene oxide or reduced graphene oxide particles described hereinabove. These batteries may have certain advantages over currently known batteries, such as having faster charging and discharging times, having longer battery life, and/or holding a greater charge per unit weight. The morphology of rIGO may permit more facile diffusion of ions in and out of the electrode structure. Such batteries may be useful to power hybrid cars and/or portable electronic devices.

EXAMPLES

Example 1: Synthesis of Graphene Oxides (IGO1, IGO2, and IGO3)

Graphene oxides were produced according to the following method, which are exemplary. Times, temperatures and pHs useful for the disclosed method of graphene oxide production are not limited to the times, temperatures and pHs used in the examples herein.

Graphite powder (Sigma-Aldrich, catalog #332461) (3.0 g) was added to a mixture of 40 mL $H_3PO_4$ and 360 mL concentrated $H_2SO_4$, and the resulting suspension was stirred in an ice bath for 2 h, and then $KMnO_4$ was added according to Table 1, below.

TABLE 1

| Sample | Graphite (g) | $H_3PO_4$ (mL) | $H_2SO_4$ (mL) | $KMnO_4$ (g) |
| --- | --- | --- | --- | --- |
| IGO1 | 3.0 | 40 | 360 | 9.0 |
| IGO2 | 3.0 | 40 | 360 | 18 |
| IGO3 | 3.0 | 40 | 360 | 27 |

Each resulting mixture was stirred for 1 h in an ice bath, and then 100 mL water was added to each mixture. After stirring for 10 min, each mixture was removed from the ice bath and then heated to 90° C. in an oil bath for 60 min. After cooling to room temperature, $Na_2CO_3$ was added until the pH of the mixture reached about 7.2. An excess of ethanol was added, and the solutions were centrifuged at 9000 rpm. The collected solids were washed with hydrochloric acid (HCl), then water, and then ethanol until the effluent reached a pH of about 7, and then the solids were isolated.

Example 2: Synthesis of a Comparative Graphene Oxide (HGO)

A comparative graphene oxide was produced according to Hummer's method. Graphite powder (Sigma-Aldrich, catalog #332461) (3.0 g) was added to a mixture of 1.5 g $NaNO_3$ in 75 mL $H_2SO_4$, and the resulting suspension was stirred in an ice bath for 2 h, and then 9.0 g $KMnO_4$ was added.

The resulting mixture was stirred for 1 h in an ice bath, and then 100 mL water was added. After stirring for 10 min, the mixture was removed from the ice bath and then heated to 90° C. in an oil bath for 1 h, and after cooling to room temperature, $Na_2CO_3$ was added until the pH of the solution reached about 7.2.

An excess of ethanol was added, and the solution was centrifuged at 9000 rpm. The collected solids were washed with HCl, then water, and then ethanol until the effluent reached pH of about 7, and then the solids were isolated.

Example 3. Hydrothermal Reduction of Graphene Oxides

Sample of about 50 mg of each graphene oxide (IGO1, IGO2, IGO3, and HGO) were placed in 40 mL aliquots of water and the resulting suspensions were ultrasonicated for 15 min, and then subjected to 180° C. for 24 h. Solids from each sample were isolated by filtration, washed with water, and then dried at 60° C. under vacuum. The reduced forms of IGO1, IGO2, IGO3, and HGO are termed rIGO1, rIGO2, rIGO3, and rHGO, respectively.

Example 4. Physical Characterization of Graphene Oxides and Reduced Graphene Oxides FIGS. 1-7 provide physical characterization of IGO1, IGO2, IGO3, HGO, rIGO1, rIGO2, rIGO3, and rHGO. Powder x-ray diffraction (XRD) analysis was performed on a diffractometer (Bruker D8 Advance) with Cu Kα radiation ($\lambda$=1.5418 Å).

The morphology of the samples was observed with scanning electron microscopy (SEM) (FEI Quanta 600, 4 keV). High-resolution X-ray photoelectron spectroscopy (XPS) studies were carried out in a Kratos Axis Ultra DLD spectrometer equipped with a monochromatic Al Kα X-ray source (hv=1486.6 eV) operating at 150 W, a multi-channel plate and delay line detector under a vacuum of about $10^{-9}$ mbar. The survey and high-resolution spectra were collected at fixed analyzer pass energies of 160 and 20 eV, respectively. Samples were mounted in floating mode in order to avoid differential charging. Charge neutralization was required for all samples. Binding energies were referenced to the aromatic $sp^2$ hybridized carbon (C=C) peak from the C is spectrum set at 284.4 eV.

XRD profiles of synthesized HGO, IGO1, IGO2 and IGO3 are shown in FIG. 1A. The intensity (101A) is shown in arbitrary units on the y-axis and the 2θ/degree angle (102A) is shown on the x-axis. The XRD pattern shows the two broad peaks arising from (002) and (100) planes in the range of about 10° and about 43° 2θ angle.

The (002) peak represents the crystalline plane along the c-axis (vertical crystallography axis) which is perpendicular to the graphene plane displaying the interplanar distance (d-spacing). Due to presence of the oxygen functional groups attached to both sides of graphene sheet and the atomic scale roughness arising from the structural spa defects generated on the originally flat graphene sheet, the GO sheets are expected to be thicker than the original single graphene sheets.

Starting from HGO to IGO3, a slight shift towards lower 2θ angle was observed indicating the enlargement of d-spacing. The d-spacing for HGO, IGO1 and IGO2 calculated from (002) peaks by Bragg's equation were found to be 0.797, 0.817 and 0.875 nm, respectively. For IGO3 the d-spacing calculation was not possible as (002) peak could be suppressed due to excessive oxidation resulting in an amorphous nature of IGO3.

Figure 1B:
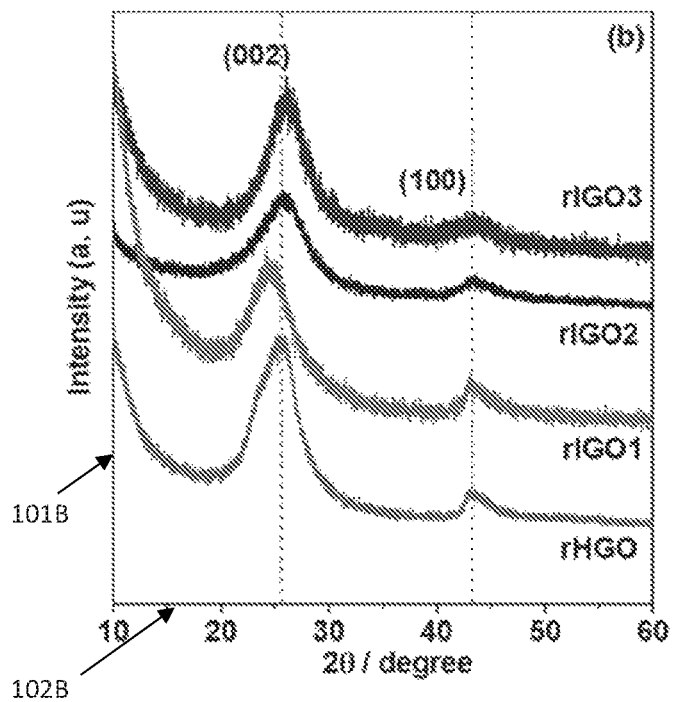
FIG. 1B shows x-ray diffraction of reduced graphene oxides (rIGO1, rIGO2, and rIGO3) made according to three different methods described herein as compared to a reduced graphene oxide made according to the traditional Hummers method (rHGO).

The XRD profiles of rHGO, rIGO1, rIGO2 and rIGO3 are shown in FIG. 1B. The intensity in arbitrary units (101B) is shown on the y-axis and the 2θ/degree angle (102B). Upon reduction, the (002) peak of GO shifts to higher 2θ angles indicating the decrease in d-spacing. The d-spacing decreases due to exfoliation and restacking of the GO sheets under the reducing conditions and the graphitic lattice is restored.

The d-spacing for rHGO, rIGO1, rIGO2 and rIGO3 were calculated as 0.348, 0.363, 0.344 and 0.342 nm, respectively. For reference, the d-spacing of the starting graphite material was calculated as 0.344 nm (not shown on graph). Notably, rIGO2 and rIGO3 show d-spacing values close to graphite indicating the near complete restoration of the graphitic lattice in these reduced graphene sheets.

Figure 2:
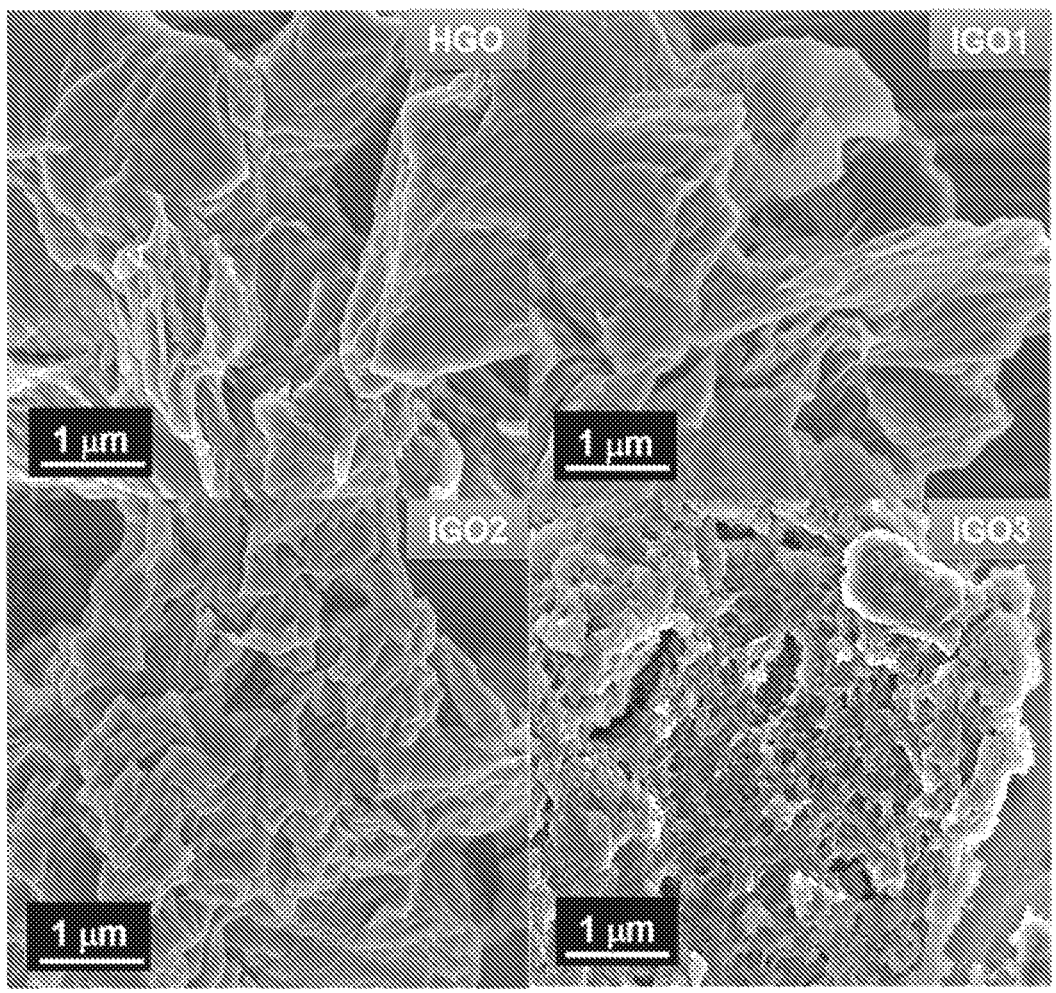
FIG. 2 shows scanning electron micrographs (SEMs) of graphene oxides IGO1, IGO2, and IGO3, as compared to graphene oxide HGO.

FIG. 2 shows the SEM images of the different GO products. HGO, IGO1 and IGO2 show a platelet-like morphology with varying particle sizes. The particles seen in IGO2 are smaller than those in HGO and IGO1. For IGO3, the material's morphology is completely different and it shows a porous structure with variation in pore sizes. The porous structure may arise from the excessive oxidation of the graphite in such a way that carbon lattice is "corroded" by oxygen and CO and $CO_2$ gases are released as a result.

Figure 3:
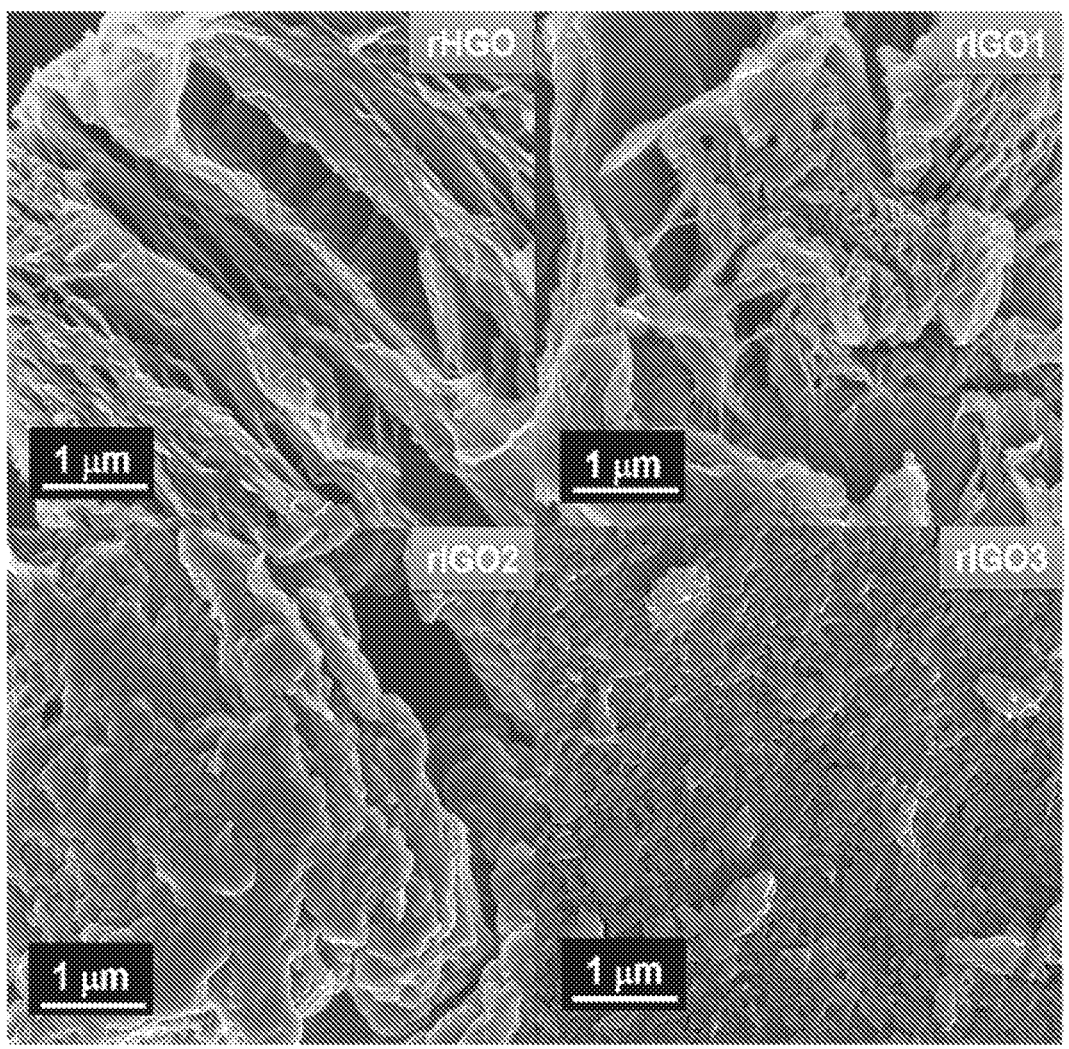
FIG. 3 shows SEMs of reduced graphene oxides rIGO1, rIGO2, and rIGO3 as compared to reduced graphene oxide rHGO.

FIG. 3 illustrates the SEM image of different reduced graphene oxide (rGO) samples. For rHGO and rIGO1, the reduction treatment produces quite similar structures with clear exfoliation evident. In the case of rIGO2, the SEM image shows the agglomeration of the exfoliated platelets, while the rIGO3 again shows a completely different morphology. The platelet size of rIGO3 is much smaller compared to other rGOs which makes rIGO3 a unique material. Moreover, rIGO3 retains its porous morphology which was observed in IGO3, as well.

Figure 4A:
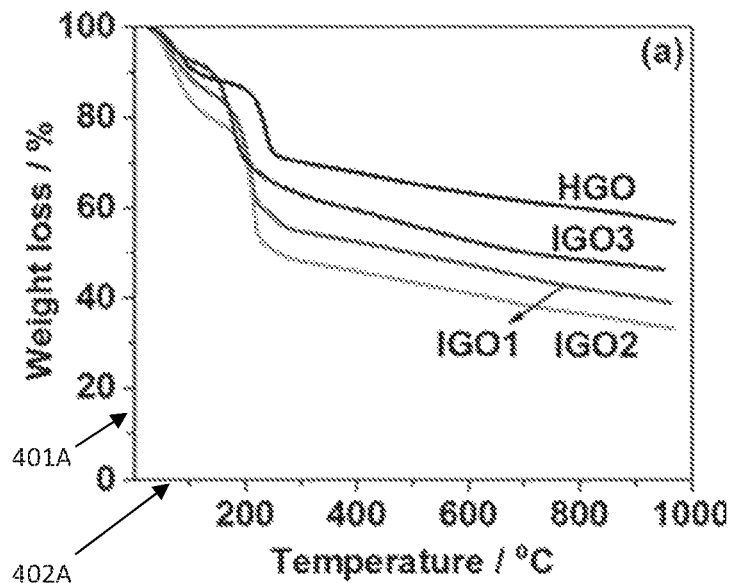
FIG. 4A shows the results of thermogravimetric analysis (TGA) of graphene oxides IGO1, IGO2, and IGO3 as compared to graphene oxide HGO.
Figure 4B:
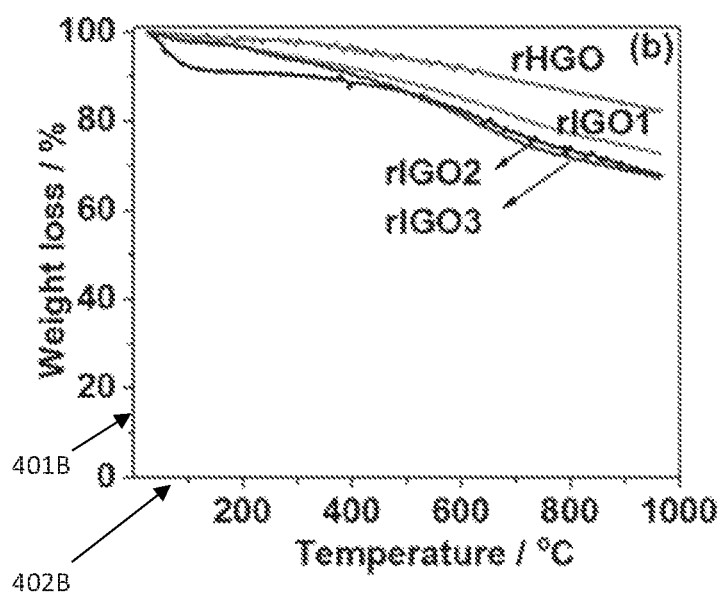
FIG. 4B shows the results of TGA of reduced graphene oxides rIGO1, rIGO2, and rIGO3 as compared to reduced graphene oxide rHGO.

Thermogravimetric analysis (TGA) was carried out to assess the thermal stability of GOs and rGOs in $N_2$ atmosphere, as shown in FIGS. 4A and 4B. Weight loss % (401A, 401B) is shown on the y-axis and Temperature/° C. (402A, 402B) is shown in the x-axis. There are two weight loss regions for GO in an $N_2$ atmosphere.

The weight loss region close to 100° C. is related to the evaporation of adsorbed water molecules which are present on GO due to its hydrophilic nature. The other weight loss region is close to 200° C. which is related to dehydration, hydroxyl and carboxyl oxygen functional groups decomposition resulting into release of steam, CO and $CO_2$ gases. All of the GO products show weight loss in both of the regions and the weight loss follows the trend of IGO2>IGO1>IGO3>HGO, as shown in FIG. 4A.

The rGOs were tested by TGA as well and results are shown in FIG. 4B. In a similar temperature range, the reduced GO materials show smaller weight loss compared to their GO counterparts due to the lower number/density of oxygen-containing functional groups. The weight loss trend follows as rIGO3≥rIGO2>rIGO1>rHGO, further corroborating that rIGO3 and rIGO2 underwent a similar level of reduction.

Figure 5A:
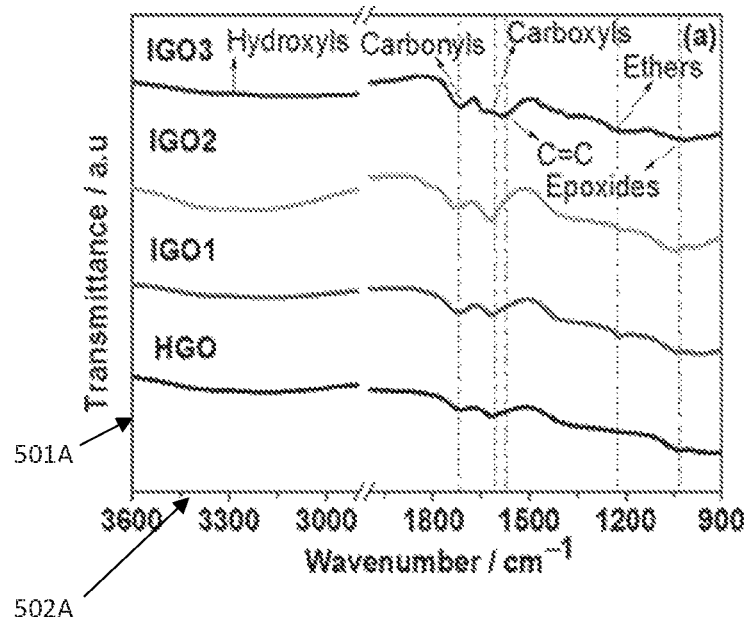
FIG. 5A shows Fourier transform infrared spectroscopy (FTIR) of graphene oxides IGO1, IGO2, and IGO3 as compared to graphene oxide HGO.

The FTIR spectra of GO products is displayed in FIG. 5A. Transmittance/a.u. (501A) is shown on the y-axis and Wavenumber/cm$^{-1}$ (502A) is shown on the x-axis. All of the GOs show several oxygen containing functional groups including carbonyl/carboxyl stretching vibration (1728 cm$^{-1}$), O—H bending of C—OH (1625 cm$^{-1}$), an O—H vibration of the C—OH groups (1384 cm$^{-1}$), a C—O vibration of the C—OH (1220 cm$^{-1}$), and a C—O—C vibration in the epoxy groups (1053 cm$^{-1}$). Although similar oxygen functional groups exist on the GO products, the intensity of these characteristic groups is higher in IGO2 and IGO3 compared to IGO1 and HGO, hence showing the higher degree of oxidation in the former.

Figure 5B:
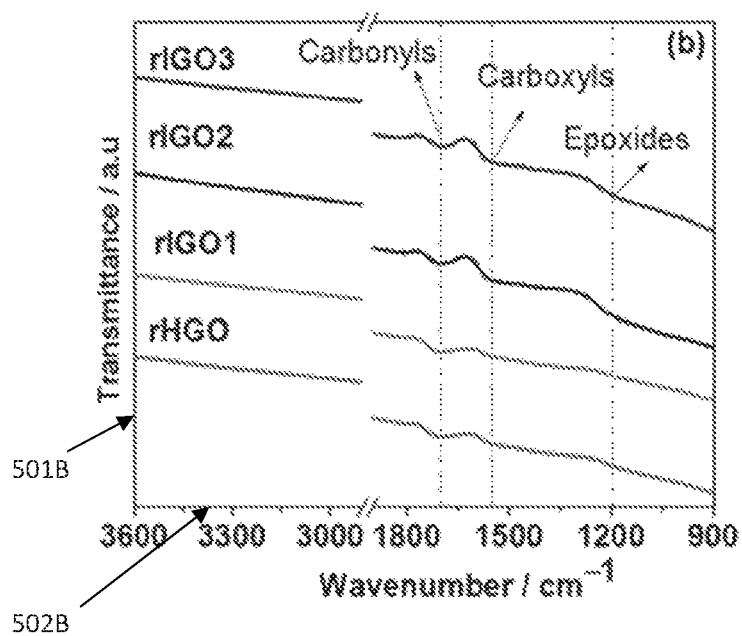
FIG. 5B shows FTIR of reduced graphene oxides rIGO1, rIGO2, and rIGO3 as compared to reduced graphene oxide rHGO.

The FTIR spectra of reduced GOs are shown in FIG. 5B. Transmittance/a.u. (501B) is shown on the y-axis and Wavenumber/cm' (502B) is shown on the x-axis. For all the rGO samples, the FTIR spectra demonstrates the presence of similar oxygen functional groups. Yet, the intensity of the peaks decreases after reduction pointing to the effectiveness of the hydrothermal reduction treatment.

Figure 6:
FIG. 6 shows the values for Brunauer, Emmett and Teller (BET) surface areas of graphene oxides IGO1, IGO2, and IGO3 and reduced graphene oxides rIGO1, rIGO2, and rIGO3, as compared to the value for BET surface area of reduced graphene oxide rHGO.

Comparing the specific surface area (SSA) is one of the indicators for the extent of structural rearrangements in GO prior to and after the reduction step. The SSA measurements for various GO and rGO products, via $N_2$ gas adsorption, were carried out and are summarized in FIG. 6, showing the GO samples (601) and the corresponding BET surface area values (602) in m$^2$ g$^{-1}$.

The BET surface area values for HGO, IGO1, IGO2 and IGO3 were measured as 22.1, 17.5, 49.6 and 1.5 m$^2$ g$^{-1}$, respectively. The specific surface area measurement of the rHGO, rIGO1, rIGO2 and rIGO3 produced under hydrothermal conditions is 10.9, 14.7, 45.5 and 3.6 m$^2$ g$^{-1}$. Surprisingly, IGO3 and rIGO3 yield the smallest BET surface area compared to other GO and rGO counterparts. The low specific surface area in IGO3 and rIGO3 could be due to self-agglomeration of the particles under the vacuum degassing at 150° C. for 24 h prior to BET surface area measurements.

Figure 7A:
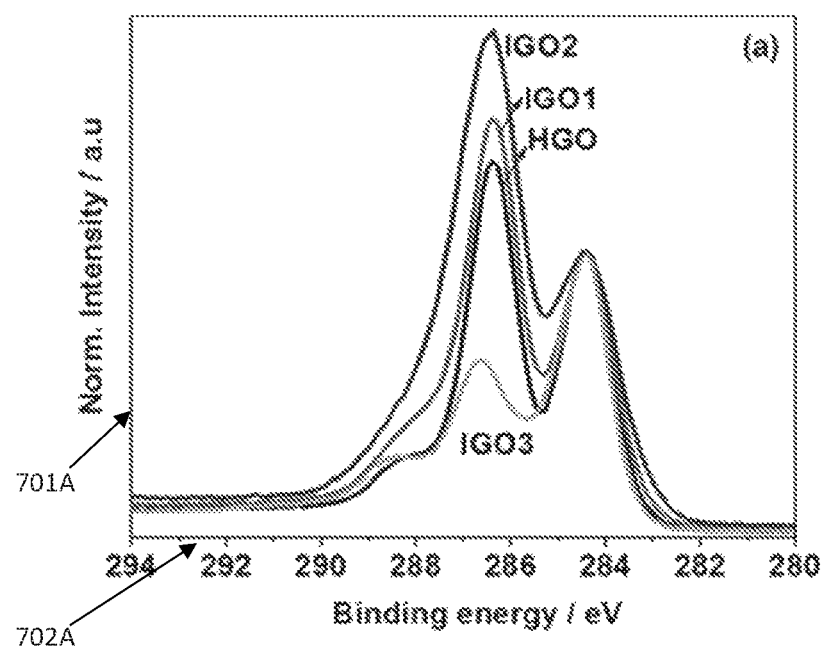
FIG. 7A shows the results of x-ray photoelectron spectroscopy of graphene oxides IGO1, IGO2, and IGO3 as compared to graphene oxide HGO.
Figure 7B:
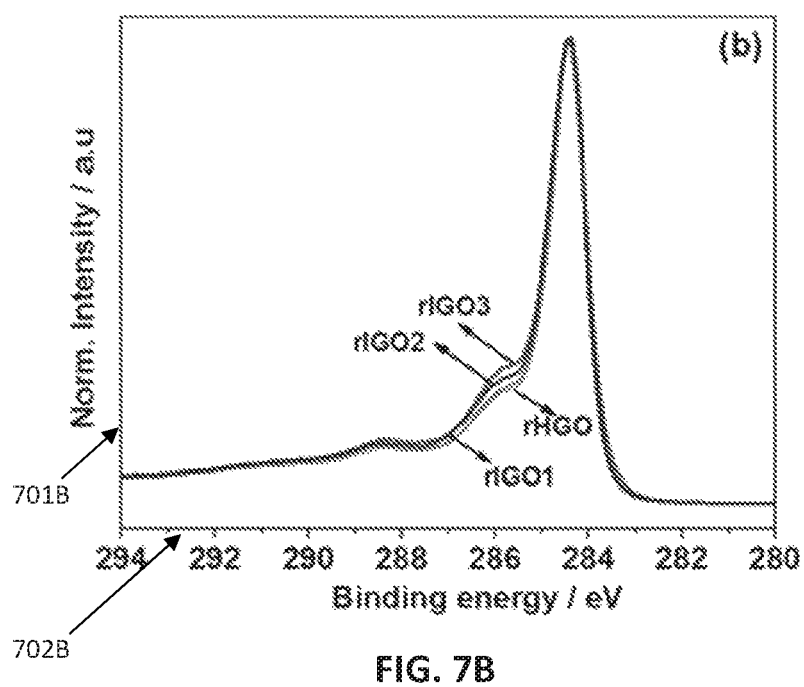
FIG. 7B shows the results of x-ray photoelectron spectroscopy of reduced graphene oxides rIGO1, rIGO2, and rIGO3 as compared to reduced graphene oxide rHGO.

XPS was used to assess the degree of oxidation and reduction as shown in FIGS. 7A and 7B. Normalized Intensity/a.u. (701A & 701B) is shown on the y-axis and Binding energy/eV (702A and 702B) is on the x-axis. The high resolution XPS spectrum of C is core level was recorded for the GO and rGO products and is shown in FIGS. 7A and 7B. The spectrum consists of a main sp$^2$ hybridized carbon (C═C) peak situated at 284.4 eV along with few carbon-oxygen group peaks.

To assess the degree of oxidation or reduction, the C is spectrum of both GO and rGO samples was normalized using the sp$^2$ carbon (C═C) peak at 284.4 eV. FIG. 7A shows that the intensity and breadth of the C—O peak (epoxy/hydroxyl) situated at 286.4 eV varies significantly, which is a reasonable indication of the degree of oxidation levels in the various GO products. Hence, the oxidation degree of the GO samples follows the trend IGO2>IGO1>HGO>IGO3.

The high resolution XPS spectra of C 1s core for rGO samples is shown in FIG. 7B. The XPS spectra shows that all of the rGO samples are very well reduced under hydrothermal conditions although the degree of reduction is different for each sample.

Notably, the XPS spectra of IGO3 and rIGO3 shows a unique behavior compared to other GO and rGO samples. The IGO3 shows the smallest degree of oxidation, however when reduced, the same sample shows the smallest degree of reduction, retaining therefore a higher amount of oxygen functional groups. The IGO3, which was exposed to the highest amount of oxidizers, is less oxidized due to the possibility of self-reduction accompanying the release of $CO_2$ or CO.

Example 5. Supercapacitance of Graphene Oxides and Reduced Graphene Oxides

FIG. 8 provides supercapacitance characterization of IGO1, IGO2, IGO3, HGO, rIGO1, rIGO2, rIGO3, and rHGO. In FIGS. 8A and 8C, Specific current/A g-1 (801A & 801C) are shown on the y-axis and E/V vs. SCE (802A & 802C) are shown on the x-axis. In FIGS. 8B and 8D, E/V vs. SCE (802B & 802D) is shown on the y-axis and Time/s (802B & 802D) is shown on the x-axis.

For electrochemical characterization, the working electrode was prepared by mixing the active material (5 mg) with Nafion binder (15 µl) in a solution of water and ethanol (1 ml, 50% v/v). The mixture was then ultrasonicated for about 30 minutes until a fine homogenous slurry was obtained. The slurry was drop-cast onto the glassy carbon electrode (5 mm diameter) and dried under a light lamp for approximately 30 min. A three-electrode cell configuration was used to evaluate the electrochemical performance of GO and rGO under cyclic voltammetry (CV) and Galvanostatic charge-discharge conditions utilizing a BioLogic VMP3 electrochemical working station. A platinum (Pt) wire and saturated calomel electrode (SCE) were used as counter and reference electrodes. All the electrochemical testing was carried out in at room temperature using 1.0 M $H_2SO_4$ as an electrolyte.

Figure 8A:
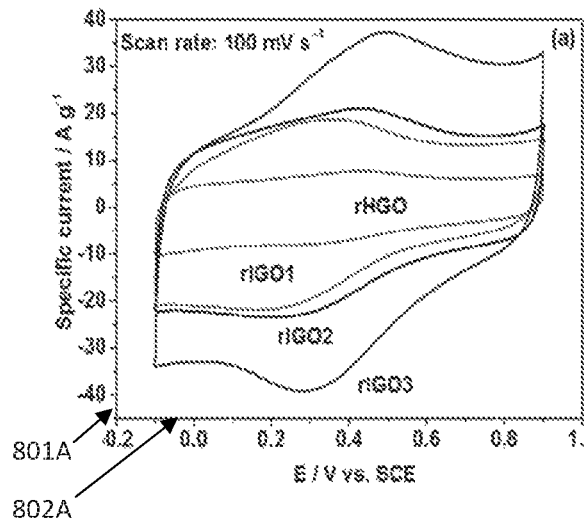
FIG. 8A shows the cyclic voltammetry of reduced graphene oxides rIGO1, rIGO2, and rIGO3 as compared to reduced graphene oxide rHGO at 100 mV s$^{-1}$.
Figure 8B:
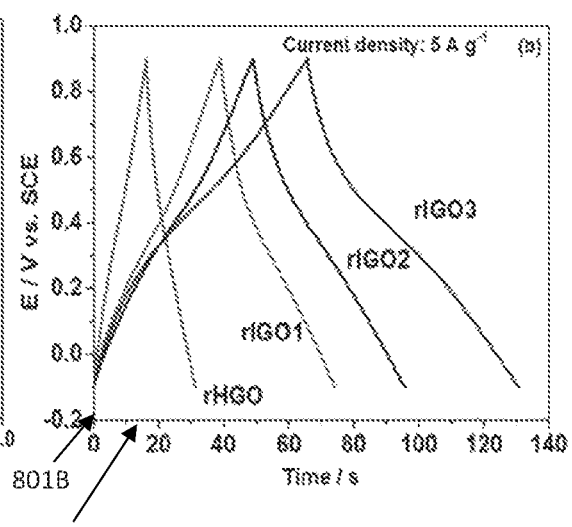
FIG. 8B shows galvanostatic charge/discharge profiles of reduced graphene oxides rIGO1, rIGO2, and rIGO3 as compared to reduced graphene oxide rHGO at a current density of 5 A g$^{-1}$.

The supercapacitance performance of rGO samples was determined using three electrode cell configuration by cyclic voltammetry (CV) and galvanostatic charge/discharge conditions in 1.0 M $H_2SO_4$ as an electrolyte, as summarized in FIGS. 8A-8D. The CV testing at the scan rate of 100 mV s$^{-1}$ in FIG. 8A shows rectangular-like curves from −0.1-0.9 V vs. SCE. The CV curves demonstrate that rIGO3 has the highest electrical double layer current (EDLC) compared to rest of the samples. The rGO samples were charged/discharged under galvanostatic conditions at 20 A g$^{-1}$ as illustrated in FIG. 8B in the potential range of −0.1-0.9 V. The results show that rIGO3 shows the highest supercapacitance and the supercapacitance trend is rIGO3>rIGO2>rIGO1>rHGO.

Figure 8C:
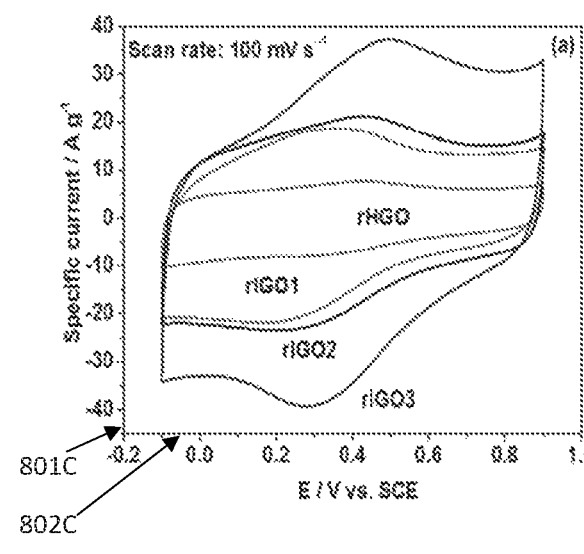
FIG. 8C shows specific capacitance versus current density of reduced graphene oxides rIGO1, rIGO2, and rIGO3 as compared to reduced graphene oxide rHGO.

To further analyze the supercapacitance performance of rGO samples, the variation in specific capacitance with increase in current density was studied as shown in FIG. 8C. The results show that all the rGOs show good rate performance.

Figure 8D:
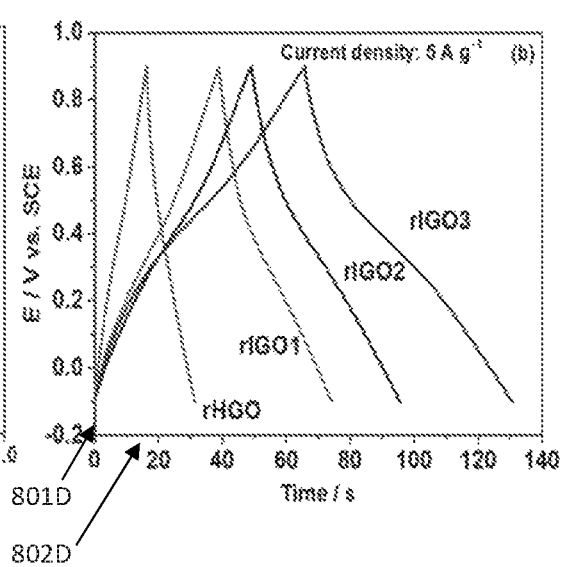
FIG. 8D shows the cyclic performance of reduced graphene oxides rIGO1, rIGO2, and rIGO3 as compared to reduced graphene oxide rHGO at a current density of 20 A g$^{-1}$.

As cyclic performance is one of the key criteria to evaluate a material for supercapacitor applications, the cyclic performance of the rGO samples was tested under galvanostatic charge/discharge conditions at 20 A g$^{-1}$ for 5000 cycles, as shown in FIG. 8D. The rGO sample shows excellent cyclic performance as the capacitance retentions is generally ~100%. The rIGO3 sample shows the highest specific capacitance compared to rest, even after 5000 cycles.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the specification are approximations that may vary depending upon the desired properties sought to be obtained by the present invention. Each numerical parameter should at least be construed in light of the number of reported significant digits and by applying ordinary rounding techniques.

Notwithstanding that the numerical ranges and parameters are approximations, the numerical values set forth in the specific examples are reported as precisely as possible. Any numerical value, however, inherently contains errors necessarily resulting from the standard deviation found in applicable testing measurements.

While the invention is susceptible to various modifications and alternative forms, specific embodiments thereof have been shown by way of example in the drawings and are herein described in detail, which are all understood to exist and be within the scope of the invention as described and claimed. Furthermore, such details are understood to be varied or modifiable while still complying with the scope of the invention set forth herein and covered by the claims. It should be understood, however, that the description herein of specific embodiments is not intended to limit the invention to the particular forms disclosed, but on the contrary, the intention is meant to cover all modifications, equivalents, and alternatives falling within the spirit and scope of the invention as defined by the appended claims.

What is claimed is:

1. A method of producing graphene oxide comprising:
   a. oxidizing graphite in a mixture of phosphoric ($H_3PO_4$) and sulfuric ($H_2SO_4$) acids, wherein the ratio of $H_3PO_4$ to $H_2SO_4$ in the acid mixture is from 1:3-1:9 by volume;
   b. stirring the graphite and acid mixture in an ice bath for 10 minutes to 2 hours;
   c. adding $KMnO_4$ to the graphite-acid mixture in a graphite to $KMnO_4$ ratio from about 1:3 to 1:9 by weight;
   d. stirring the resulting mixture from step (c) in an ice bath for 10 minutes to 2 hours to form a graphene oxide-dispersion;
   e. adding a volume of water to the graphene oxide-dispersion, said water having a pH of 0-3 and a volume about one-fourth of the starting acid volume, and stirring the water and graphene oxide dispersion for 10 minutes to 2 hours;
   f. heating the graphene oxide-dispersion to 60-120° C. for 6 minutes to 8 hours;
   g. cooling the graphene oxide-dispersion to room temperature;
   h. adjusting the graphene oxide-dispersion to a pH of 7.0-7.6, wherein the adjusting step comprises adding $Na_2CO_3$, NaOH, KOH, $KCO_3$, $CaCO_3$, or any mixture thereof;
   i. adding excess alcohol to the graphene oxide-dispersion, wherein the alcohol is selected from methanol, ethanol, propanol, isopropanol, or butanol;
   j. isolating the graphene oxide by centrifugation;
   k. sequentially washing the isolated graphene oxide with acid, then water and then alcohol until the effluent reaches a pH of 7.0-7.2; and
   l. collecting the graphene oxide solids.

2. The method of claim 1, wherein the oxidizing step is in the absence of $NaNO_3$.

3. The method of claim 1, wherein the stirring in steps b, d, e takes place in ice bath.

4. The method of claim 1, wherein the adjusting step comprises adding $Na_2CO_3$.

5. The method of claim 1, wherein the alcohol is ethanol.

6. The method of claim 1, further comprising reducing the isolated graphene oxide.

7. The method of claim 6, wherein reducing the isolated graphene oxide is by hydrothermal reduction.

8. The method of claim 7, wherein the hydrothermal reduction comprises:
   a. diluting the isolated graphene oxide in water;
   b. dispersing the diluted graphene oxide of step (a) with sonication;
   c. heating the dispersed solution of step (b) for about 24 hours at about 180° C.; and
   d. isolating the reduced graphene oxide.

9. A method of producing graphene oxide comprising:
   a. oxidizing graphite in a volume of phosphoric ($H_3PO_4$) and sulfuric ($H_2SO_4$) acids as a graphite-acid mixture wherein the ratio of $H_3PO_4$ to $H_2SO_4$ in the acid volume is from 1:3-1:9 by volume, said volume having a greater than 50% concentration of acid;
   b. stirring the graphite-acid mixture for 10 minutes to 2 hours;
   c. adding $KMnO_4$ to the graphite-acid mixture, wherein the graphite to $KMnO_4$ ratio is from 1:3 to 1:9 by weight;
   d. stirring the resulting mixture from step (c) for 10 minutes to 2 hours to form a graphene oxide-dispersion;
   e. adding a volume of water to the graphene oxide-dispersion, said water having a pH of 0-3 and a volume about one-fourth of the starting acid volume, and stirring the water and graphene oxide dispersion for 10 minutes to 2 hours;
   f. heating the graphene oxide-dispersion to 60-120° C. for 6 minutes to 8 hours;
   g. cooling the graphene oxide-dispersion to room temperature;
   h. adjusting the graphene oxide-dispersion to a pH of 7.0-7.6, wherein the adjusting step comprises adding $Na_2CO_3$, NaOH, KOH, $KCO_3$, $CaCO_3$, or any mixture thereof;
   i. adding excess alcohol to the graphene oxide-dispersion, wherein the alcohol is selected from methanol, ethanol, propanol, isopropanol, or butanol;
   j. isolating the graphene oxide by centrifugation;
   k. sequentially washing the isolated graphene oxide with acid, then water and then alcohol until the effluent reaches a pH of 7.0-7.2; and
   l. collecting the graphene oxide solids.

10. The method of claim 9, wherein the oxidizing step is in the absence of $NaNO_3$.

11. The method of claim 9, wherein the stirring in steps b, d, e takes place in ice bath.

12. The method of claim 9, wherein the adjusting step comprises adding $Na_2CO_3$.

13. The method of claim 9, wherein the alcohol is ethanol.

14. The method of claim 9, wherein the volume of water added is one-fourth the volume of the acid volume in step (a).

15. The method of claim 9, wherein the graphene oxide dispersion is heated to 90° C. for 60 minutes.

16. The method of claim 9, further comprising:
reducing the isolated graphene oxide by hydrothermal reduction, which comprises
   a. diluting the isolated graphene oxide in water;
   b. dispersing the diluted graphene oxide of step (a) with sonication;
   c. heating the dispersed graphene oxide of step (b) for about 24 hours at about 180° C.; and
   d. isolating the reduced graphene oxide.

\* \* \* \* \*